Figure 1:
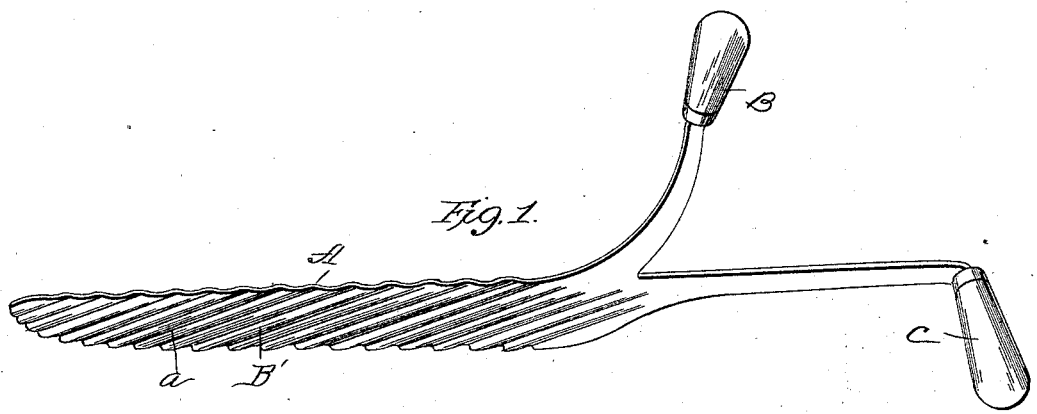

(No Model.)

W. H. CARTER.
HAY KNIFE.

No. 422,724. Patented Mar. 4, 1890.

Attest:
Willett Donaldson
James M. Spear

Inventor
Wallace H. Carter
by Ellis Spear
Atty

UNITED STATES PATENT OFFICE.

WALLACE H. CARTER, OF EAST MILTON, MASSACHUSETTS.

HAY-KNIFE.

SPECIFICATION forming part of Letters Patent No. 422,724, dated March 4, 1890.

Application filed September 16, 1889. Serial No. 324,075. (No model.)

*To all whom it may concern:*

Be it known that I, WALLACE H. CARTER, of East Milton, in the county of Norfolk and State of Massachusetts, have invented a new and useful Improvement in Hay-Knives; and I do hereby declare that the following is a full, clear, and exact description of the same.

My invention is an improvement in hay-knives of that class in which the blade is grooved or corrugated on its side at an angle to the cutting-edge, so as to form what is called a "sickle-edge," and at the same time provide means for guiding the knife in the operation of cutting, as the ends of the cut hay enter the grooves in the blade and tend to hold the knife to its work.

Prior to my invention it has been customary to groove but one side of the knife—namely, that side opposite the mow in cutting—while the other side of the blade was plain. In this way in order to provide grooves upon one side it was necessary to remove a portion of the material of the blade, which thus of course tended to weaken the blade at these points. Further, the sickle-edge was formed by grinding upon the plain face, and a good deal of the material of the edge was ground away before the serrated edge was formed, as it was necessary to grind away the plain edge until the side of the blade which contained the grooves was reached.

Two of the principal objects of my invention are, first, to provide for the grooving of the blade without the removal of any of the material, and, secondly, to allow of the formation of the serrated cutting-edge without the loss of much material in the grinding process, and I attain these objects by making the blade with grooves upon each side running at an angle to the cutting-edge and of substantially the form heretofore used upon one side of hay-knives of this class; but instead of removing the material in order to make these grooves I make the blade practically of sinuous form in longitudinal section, the grooves upon one side forming the raised portions between the grooves upon the other side, and thus I provide a blade grooved upon both sides, which thus increases its capacity to keep to its work, and at the same time retains the blade of a uniform thickness, thereby increasing its strength. I attain the second object by curving the blade in transverse section and grinding the lower edge of the concave portion, which thus forms the serrated cutting-edge and requires only the grinding of the extreme edge and the removal of a minimum amount of the material of the blade, and at the same time it does not interfere with the action of the ends of the cut hay in the grooves of the concave face of the blade.

Figure 2:
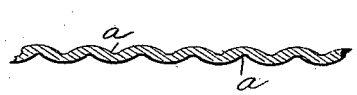
Figure 3:
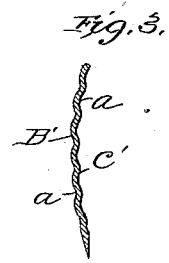

In the accompanying drawings I have represented, in Figure 1, a hay-knife embodying my invention. Fig. 2 shows a longitudinal section of the same, and Fig. 3 a transverse section.

In the drawings the blade is represented at A and the handles at B C. The blade is grooved upon each side, as shown at $a$, and is formed with a convex portion B' on one side and a concave portion C' on the other. The grooves in the blade run at an angle to the cutting-edge and the handles are so located relatively to the grooves that the said grooves, if continued upward, would pass between the said handles. I form the concavity in the blade so as to provide means for forming a cutting-edge without waste of material, and in order to bring the edge in the proper location relatively to the rest of the blade I sharpen the lower edge of the concave portion, grinding into the grooves upon the other side, thus forming a serrated cutting-edge with the removal of a minimum amount of the material of the blade.

In grooving the opposite sides of the blade I make the grooves on one face so as to alternate with the grooves on the opposite face, thus forming the blade practically sinuous and providing a double-grooved blade without the removal of any material.

While I have shown and described my invention as applied to a hay-knife, it will be understood that I do not limit myself in this connection, but may apply my improvement to other classes of knives or cutters where a sickle or serrated edge is used. The only difference in the application of the invention would be in the angle of the grooves, as a hay-knife requires a special angle, while other knives or cutters would in most cases be provided with the grooves extending more nearly crosswise of the blade.

I claim as my invention—

1. A hay-knife having its blade grooved upon each face, said grooves running at an angle to the cutting-edge, substantially as described.

2. A knife-blade or cutter having a serrated edge, said serrations being formed by grooves running across the blade, the said blade being curved in transverse section, substantially as described.

3. A hay-knife provided with a blade grooved upon each face, the grooves upon one face alternating with the grooves upon the other, said blade being curved in transverse section, the lower edge of the concaved face being ground, substantially as described.

In testimony whereof I have signed my name to this specification in the presence of two subscribing witnesses.

WALLACE H. CARTER.

Witnesses:
GEO. L. GILL,
JOSEPH M. GLOVER.